United States Patent [19]

Hackman et al.

[11] 4,189,268
[45] Feb. 19, 1980

[54] DIVER-CONTROLLED UNDERWATER LINEAR MILLING MACHINE

[75] Inventors: Donald J. Hackman, Columbus; Roger L. Brunel, Grove City, both of Ohio

[73] Assignee: The United States of America as represented by the Secretary of the Navy, Washington, D.C.

[21] Appl. No.: 909,319

[22] Filed: May 24, 1978

[51] Int. Cl.² .............................................. B23C 1/20
[52] U.S. Cl. ................................... 409/183; 114/222; 405/188; 409/204
[58] Field of Search ...... 90/12 R, DIG. 23, DIG. 25, 90/ DIG. 13; 405/185, 188, 190; 82/4 R; 83/178; 408/76; 114/51, 50, 222; 409/183, 204, 235

[56] References Cited

U.S. PATENT DOCUMENTS

| | | | |
|---|---|---|---|
| 957,897 | 5/1910 | Neubert | 408/76 |
| 975,534 | 11/1910 | King | 408/76 X |
| 1,289,957 | 12/1918 | Yambacopolo | 405/188 X |
| 1,312,473 | 8/1919 | Deam | 405/188 X |
| 1,396,885 | 11/1921 | Sanchez | 405/188 |
| 2,946,246 | 7/1960 | Allan | 408/76 |
| 3,261,235 | 7/1966 | Henkel | 408/76 |
| 3,293,963 | 12/1966 | Carroll et al. | 83/178 X |
| 3,596,558 | 8/1971 | Rydell | 408/76 X |
| 3,813,887 | 6/1974 | Kruger et al. | 114/51 |

FOREIGN PATENT DOCUMENTS

| | | | |
|---|---|---|---|
| 2238838 | 2/1974 | Fed. Rep. of Germany | 408/76 |
| 2458491 | 6/1975 | Fed. Rep. of Germany | 114/222 |
| 110769 | 2/1967 | Norway | 114/222 |
| 115567 | 10/1968 | Norway | 114/222 |

*Primary Examiner*—William R. Briggs
*Attorney, Agent, or Firm*—Richard S. Sciascia; Paul N. Critchlow

[57] ABSTRACT

A linear milling machine adapted to be carried and controlled by a diver mounts a hog mill cutter on a frame which itself is secured to the work preferably by a hold-down suction cup arrangement. A driven feed-screw advances the cutter relative to the work. Hydraulic motors drive the cutter and the feed screw as well as a pump used to establish the hold-down power. The suction motor and pump are mounted in a separate oil-filled and pressure-compensated casing. Another small and portable casing provides diver-controlled hydraulic flow regulation for the cutter motor, the feed screw drive and the suction pump motor. By controlling the drive speeds, cuts can be made utilizing only the suction grippers to firmly hold the frame to the work. At the end of each cut, the cutter is manually returned and the suction released to permit the frame to be quickly repositioned and secured for another continuation cut.

9 Claims, 7 Drawing Figures

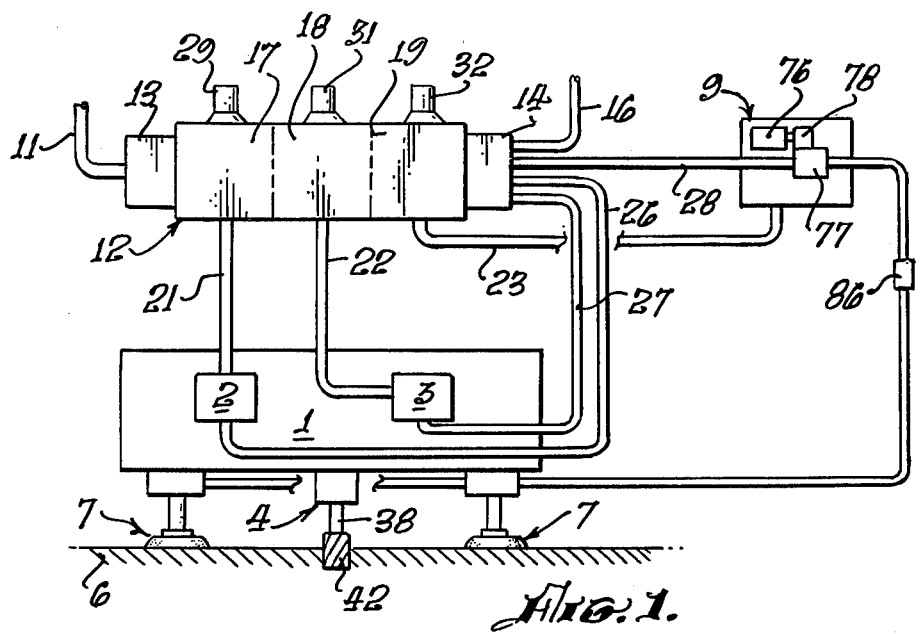
Fig. 1.
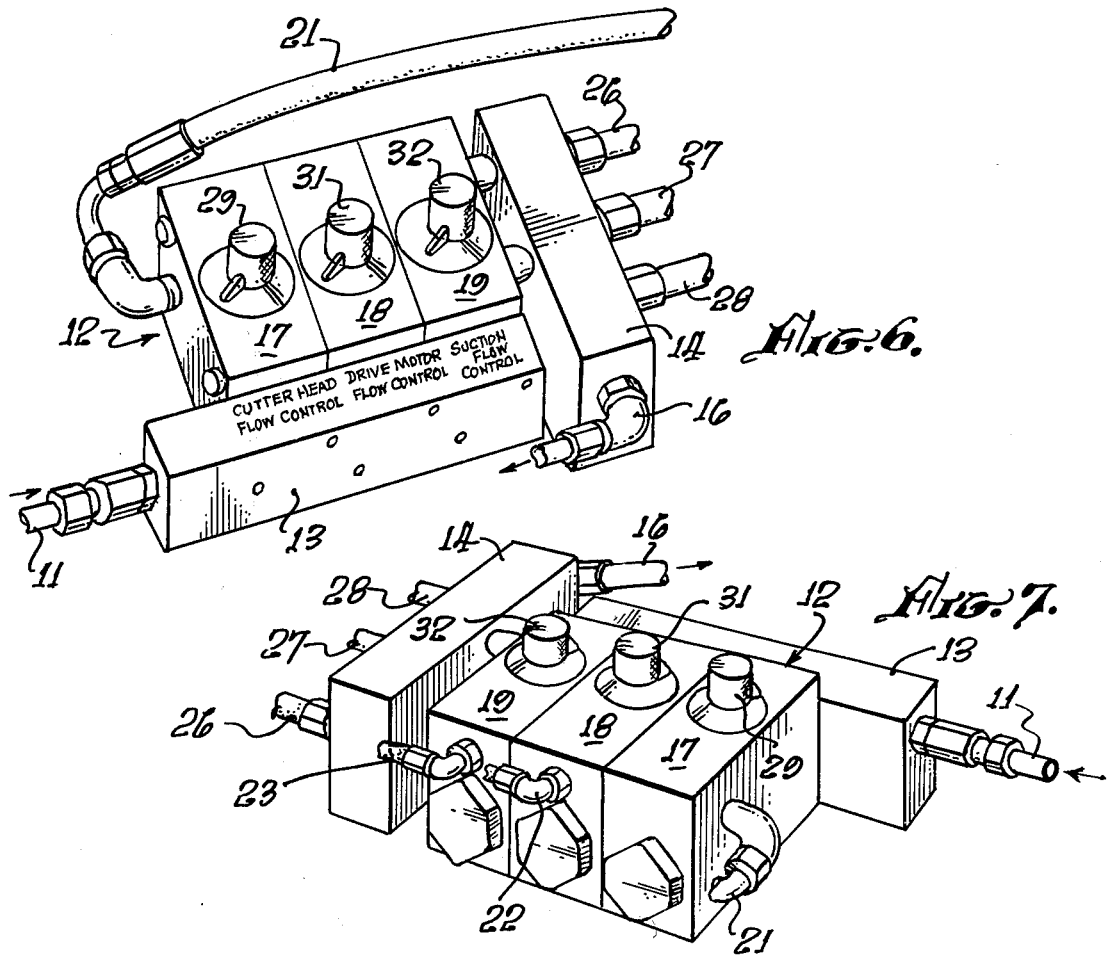
Fig. 6.
Fig. 7.

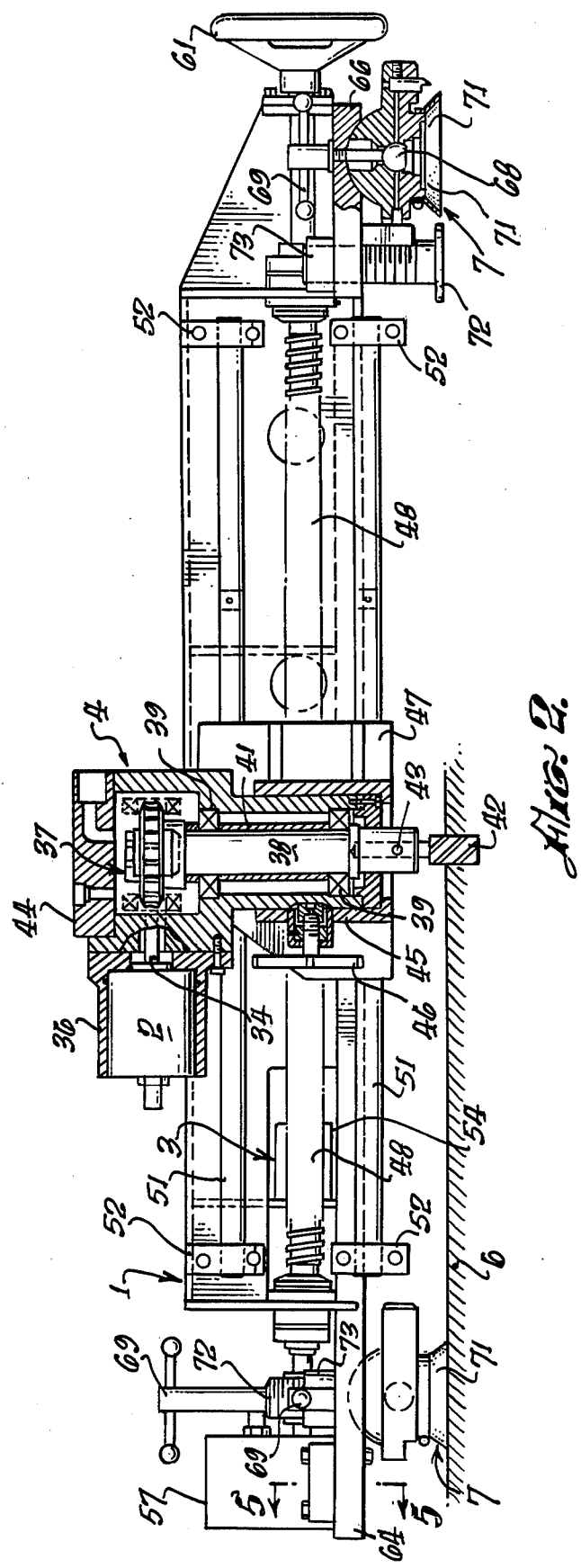

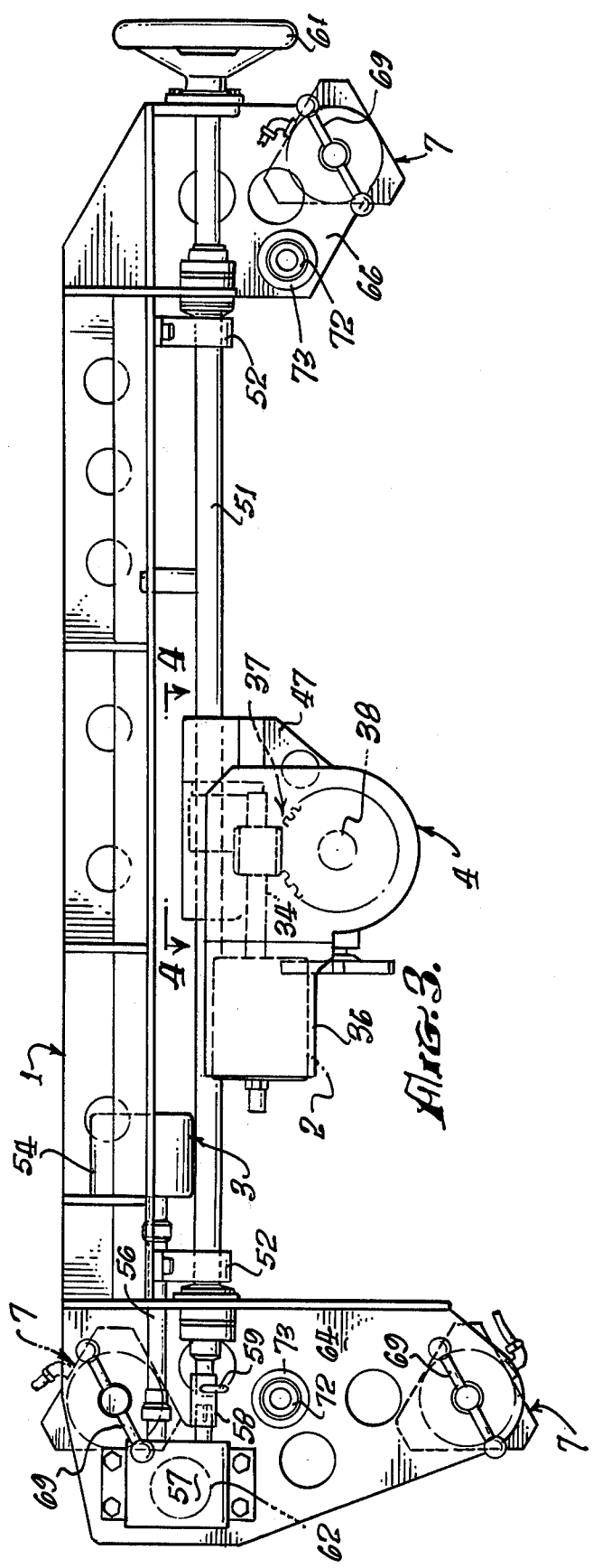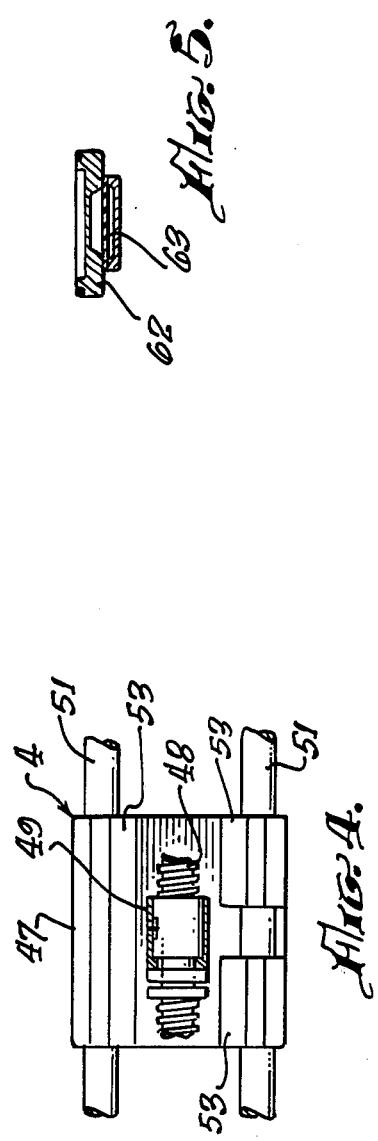

DIVER-CONTROLLED UNDERWATER LINEAR MILLING MACHINE

BACKGROUND OF THE INVENTION

The present invention relates to linear milling machines and especially to the adaption of such machines for use by divers at substantial underwater depths.

Salvage and other operations conducted by divers require equipment to cut sections of metal panels from submerged structures such as sunken or damaged vessel hulls. Also, in the petroleum industry, there is a rather frequent need to cut out damaged structural portions of pipeline sections although, as far as is known, no successful system has been developed for this purpose. Apparently, the state of the art, at least as far as the salvage operations are concerned, has relied mainly on the use of cutting torches or of linear shaped explosive charges. In some situations, these methods are acceptable although by their nature they are not capable of providing accurate cuts through heavy materials such as submarine hulls or HTS surface ships. Further, both the torches and the explosives pose problems when the vessel contents include dangerously-explosive objects or materials such as torpedoes, ammunition, missiles, etc. Another problem that is conventional torches such as the oxy-arc cutting torches are limited in their underwater use to depths of no more than about 300 feet.

Obviously, there is a need for a cutting machine capable of being carried to the work by the diver and of performing cutting operations entirely under the control of the diver. Milling machines, of course, can perform such cuts although, as is known, conventional machine-shop installations are heavy and cumbersome stationary units on which the work piece is mounted and moved across the cutting head. Such equipment clearly is not suited for underwater work.

The primary object of the invention is to provide an underwater milling machine capable of being transported by a diver to the submerged work piece and of being fully controlled by the diver during its cutting operations.

Another object is to provide a machine which can be secured to the work easily and quickly without the need for heavy bolts or other physical interconnections.

Still another object is to provide a securing arrangement that can be quickly released to enable repositioning of the machine for a continuation cut. As will be described, the securing is achieved by hold-down suction pads.

A further object is to provide an hydraulically-driven milling system which can be pressure-compensated according to the ocean depth and which also can be easily controlled entirely by the diver.

A number of other, more specific objects and advantages will become apparent in the ensuing detailed description.

BRIEF DESCRIPTION OF THE DRAWINGS

The invention is illustrated in the accompanying drawings of which:

FIG. 1 is a block diagram showing the various components of the present system and the hydraulic circuitry used to drivably achieve the cutting operations;

FIG. 2 is a side elevation of the frame-supported cutting machine with certain of its components shown in section;

FIG. 3 is a partially-sectioned top view of the FIG. 2 machine;

FIGS. 4 and 5 are sections taken along lines 4—4 and 5—5 of FIG. 2, and

FIGS. 6 and 7 are perspective views of a special hydraulic flow control manifold arrangement.

DETAILED DESCRIPTION OF THE INVENTION

As shown in FIG. 1, the system includes a rigid main frame 1 mounting a cutting head motor 2, a feed control motor 3 and a cutter head mechanism 4. Each of these components will, of course, be described in detail. The present description simply seeks to outline the major components which a diver carries to the submerged working location and to provide a generalized understanding of the hydraulics of the system. As shown, frame 1 is secured by the diver to workpiece 6 by special hold-down suction pads 7 deriving their holding power from a suction pump and motor arrangement mounted in casing 9. Cutting head motor 2 and feed motor 3 also are hydraulically driven and, for these purposes, these motors, as well as the suction motor, are supplied with pressurized hydraulic fluid through a main supply line 11 which, for most operations, will extend to a surface source. Control of the drive of all motors is achieved by a flow control manifold arrangement including a casing 12, an intake manifold 13 and a return manifold 14 which, as shown, has a main return line 16 through which the exhaust fluid is returned to source. Casing 12, as shown by the dotted lines of FIG. 1, is divided into three separate compartments or chambers 17, 18 and 19 each of which is individually communicated with intake manifold 13 and each of which has a separate supply line conducting the hydraulic fluid to a particular motor. As seen, these supply lines include cutting motor conduit 21, feed control conduit 22 and suction motor conduit 23. Return lines 26, 27 and 28 circulate motor exhaust fluid back to return manifold 14. All lines are flexible hose type conduits. Control of the flow to each motor is provided by flow control valves 29, 31 and 32 which are conventional valves used to regulate flow rate.

The components shown in FIG. 1 are carried by the diver to the submerged location. For this purpose, if desired, the components can be carried in special bags the buoyancy of which can be controlled by the diver. For descent, the buoyancy of the bag can be adjusted in any desired manner. For ascent, the diver can use his air supply to regain buoyancy. At the submerged location, frame 1 first is secured by its suction pads and the cutting operations then performed by controlling the cutter motor and its feed. The cutter travels lengthwise of the frame and, if needed, additional continuation cuts can be made by releasing the suction and repositioning the frame.

FIGS. 2 and 3 are assembly drawings showing in some detail the cutter, its feeding mechanism, the suction grippers and other components carried by main frame 1 of the milling machine.

Cutter head mechanism 4 provides support and torque for the mill cutting tool. It is formed of previously-described hydraulic motor 2 having a drive shaft 34 extending into a cutter spindle housing 36 where it mounts a worm gear reducer assembly 37 for rotatably driving a spindle shaft 38. Motor 2 preferably, is an Ackley Hyrevz, Model 66643-33 which, under normal conditions, requires 5 gpm of 1000 psi hydraulic fluid to develop an output of 3 hp. The worm gears provide a speed reduction of 7.5 to 1 to convert the motor output speed to a spindle speed of 175 rpm. Spindle 38, in turn, is supported by two roller bearings 39 spaced by a ring 41, the bearings counteracting forces produced by the gear reducer and the cutting tool. The tool itself, identified by numeral 42, is a Dapra Hog Mill Cutter, DW 2056 having a four-fluted cutting portion that is ¾ inch in diameter by 1½ inches long. As shown, it is carried in a ⅝ inch diameter socket formed in the spindle and held securely by two set screws 43. Housing 36 is an aluminum housing enclosing the motor gears and spindle bearings. To permit pressure compensation at the ocean depths, it employs a diaphragm 44 as part of the enclosure. The housing, as will be noted, is mounted in a ring-shaped support member 45 where it is held by a hand screw 46 which can be quickly loosened to permit removal.

Ring 45, in turn, is part of a support bracket 47 (FIG. 3) which, in effect, is a carriage riding on a feed screw 48 extending lengthwise of main frame 1. As best seen in FIGS. 3 and 4, bracket 47 carries a main feed nut 49 threadably engaging feed screw 48 so that rotation of the feed screw advances the nut and the carriage to cause the rotatably-driven hog mill cutter to perform its work. Further support for the carriage is provided by a pair of stainless steel rails carried by frame-supported brackets 52. As seen in FIG. 4, support bracket 47 (i.e. the carriage) includes low friction Delrin pillow-block bushings 53 riding on the rails and providing rigid support as the carriage traverses the mill frame.

Feed screw 48 is hydraulically powered to move the cutting head along its linear path at a steady velocity. Its drive includes a hydraulic motor 3 having a drive shaft 56 extending into a gear box 57 used to reduce the motor rpm. To drive the feed screw, it also is coupled into the gear box through a disconnect coupling 58 (FIG. 3) having a simple snap ring pin 59 by means of which the drive can be disconnected. The purpose of the disconnect is to permit a manual return of the carriage to its starting point after a full power cut has been made. Manual return is accomplished by rotating a hand wheel 61 coupled to the feed screw.

The feed-screw motor, preferably, is an Eastern Hydraulic Gear Motor, Model 2107 R receiving hydraulic fluid through previously-mentioned line 21 at approximately ½ gpm at a supply pressure of 1000 psi. Output at 300 rpm is converted to a linear motion with a 1-inch diameter by 3/16 ipr. Feed screw 48 forces its low friction nut 49 along its length at a rate of ½ to ¾ ipm. In the illustrated embodiment, a 24-inch slot or cut is made in about 40 minutes. Gear box 57, as shown in FIG. 5, is formed with a pressure compensating cover 62 filled with a membrane 63.

During the milling operations it normally is intended that the mill frame be held to the workpiece by the three suction hold down pads assemblies 7 two of which are mounted at the left end of the frame (FIG. 3) on a laterally-expanded platform 64 and the third on another platform 66 at the right hand end. Each pad assembly is mounted in its platform by means of a shaft 67, a ball joint 68 and a large wing screw 69. The gripper portions or pads are 5¼ inch diameter aluminum pads fabricated with neoprene lips. In initially positioning the pads, they are allowed to float on the ball joint to conform with irregularties in the work piece surface. Subsequently, they are locked in position by the large wing screws. Each pad also carries three prongs 71 (FIG. 2) formed of sharpened tool steel and oriented to dig into the workpiece surface to prevent lateral slippage of the frame during milling.

Even though pad assemblies 7 are normally used, it is anticipated that there may be situations in which they are unable to exert sufficient holding force. Consequently, a back-up system is provided enabling the frame to be bolted to the workpiece. This system essentially includes two leveling pads 72 disposed, as shown in FIG. 3, one on each of platforms 64 and 66 in substantial alignment. Large, knurled locking nuts 73 (FIG. 2) secure the position of the leveling pads and each pad shaft has an axial bore to receive a bolt or an explosive stud. To bolt the frame to the workpiece, the first step is to contact the workpiece with the suction pads and then lower the leveling pads to a point at which prongs 71 of the suction pads clear the workpiece surface by about ¼ inch. Knurled nuts 73 are used to lock this position and the hole location for the bolts then is marked. With the main frame removed the bolt holes are drilled and the frame re-installed. The bolts or studs then extend through the axial bore of the leveling pad shaft into the drilled holes. Obviously, after a full frame length cut has been made, the bolts must be removed and the mill repositioned and re-bolted for the next cutting sequence.

It is important at this point to note that the suction gripper pads and especially the hydraulic system used to establish the hold-down power of these pads form the subject matter of a copending patent application, Ser. No. 840,865 entitled "Submersible Apparatus for Evacuating Seawater from Suction-Type Work-Handling Gripper Members," filed Oct. 11, 1977 in the names of the present inventors. Although the present description will outline the principles disclosed in this application, it is assumed that reference will be made to it if additional details are desired. Also, the use of the previously-disclosed apparatus is considered an optional matter and, as will be recognized, other suitable hydraulically-actuated suction gripper devices can be substituted without departing from the principles of the present system.

As shown in FIG. 1, the hydraulic system for the suction gripper includes an hydraulic motor 76, a high pressure seawater pump 77 and a gear reducer arrangement 78 between the pump and motor. These components all are mounted in a light-walled casing 9 filled with hydraulic fluid. Hydraulic fluid is supplied directly to the motor through conduit 23 which, as shown, is coupled to valved flow control manifold 12 which receives the source fluid. The fluid exhaust of the motor is discharged directly into the casing to establish an interior pressure which can be controlled relative to the external seawater pressure. This pressure control or compensation permits the use of a thin-walled, light weight casing that is easily transportable by the diver. The motor, of course, drives pump 78 to create a suction pressure in the seawater area between the gripper pads and the workpiece. Sea water evacuation creates the gripping force by establishing a pressure differential acorss the gripper pads. Pump discharge is directly into the external seawater. With this arrangement, the evacuation of the seawater eventually will stall the motor which then remains stalled until leakage occurs and causes the pump to resume its operation. As will be shown, such a seawater evacuation system is capable of firmly holding the frame to the workpiece under most operating conditions providing the cutting speed is controlled. If high speed cutting is desired, the previously-described bolting arrangement can be used although any gain in time due to faster cutting usually will be greatly exceeded by the loss of time in setting the bolts and in resetting them for each continuation cut.

The flow control manifold arrangement shown in FIGS. 6 and 7 already has been described with reference to block diagram of FIG. 1. As there noted, its primary function is to control the supply of hydraulic fluid to each of the three motors, i.e. cutter motor 2, feed screw motor 3 and suction gripper motor 76. For this purpose, each chamber 17, 18 and 19 of flow control casing 12 mounts a flow control valve arrangement designated in FIG. 6 as valves 79, 81 and 82. These are conventional valves adapted to apportion a suitable flow to each motor to optimize the operation of the system as a whole. Preferably, Teledyne Republic flow-control valves, Model 644-2-1-1/2D2 are used. Optimum system performance requires a total of 7 gpm of hydraulic fluid. A relief valve also is used to by pass excess fluid to manifold return 14 and maintain a maximum supply pressure of 1000 psi to the motors. Diver control of the flow control valves is provided by the short handle and is locked by the knurled knobs projecting upwardly of casing 12. The casing can be inscribed with indices used to adjust the flow.

A fuller understanding of the present milling machine can be obtained by considering the procedures preferably employed in its use. First, since a diver is to transport it to the work and to control it during the cutting operations, it is desirable to perform a pre-dive inspection prior to each use. This inspection is performed at the surface and it includes a thorough testing of all systems. Also, the intended cutting sequence should be mapped out by the diver on the work piece prior to operating the milling machine. For example, each cut using the preferred hog mill tool provides a slot ¾ inch wide and 24 inches long. To produce straight-sided openings of any size, connecting slots of any desired length can be successively cut and additional cuts then made at appropriate angles to the original connecting slot. The desired cutting pattern is mapped and then prepared for the milling operation by the drilling of 1-inch diameter holes at suitable locations. These holes are needed to permit the insertion of the cutting tool and provide the starting point of each milled slot.

With the machine installed and its cutter inserted into the drilled holes, the cutting operation then is initiated by the diver. As has been indicated, full diver control is available although normally the positions of the flow control valves will be set before the dive since the cutting conditions then are known. However, variations in the flow rate can be achieved during the cut if needed. The diver, in effect, has two controls available for each of the functional components, i.e. the cutting head, the feed screw mechanism and the sea water evacuation system. The first control is provided as indicated, by the flow control manifold valves. The second control is that of the activating and deactivating of the cutting head, feed-mechanism and hold-down pads. With reference to FIG. 1, the cutting head is activated by turning the handle on a ball valve 83 shown, for convenience, installed on supply line 21. Similar control of the feed motor is provided by valve 84 installed on its supply line 22. Control of the hold-down pads is achieved by a bypass valve 86 on line 30. In practice these three on-off type valves normally would be conveniently disposed on frame 1 with the respective supply lines led to them. By-pass valve 86 is opened to allow ambient seawater to enter the pump with the result that suction pressure at the pads is eliminated. This valve also serves as a priming device when the pump is started.

With the cutting head motor activated, the feed motor is turned 'on' to drive the feed screw and advance the cutting tool to form the desired slot. At the end of the tool travel, the cutting head valve and feed valve are closed and previously-mentioned pin 59 (FIG. 2) removed to disconnect the screw and permit its return to start position using handwheel 61. The pin then is reinserted and the frame released from the work piece by opening by-pass valve 86. Continuation cuts or angle cuts then can be made by repositioning the frame, securing it and activating the motors.

The system as described is designed to mill linear slots in steel plates at substantial ocean depths. Openings of almost any area can be produced by milling a series of slots ¾ inch wide and 24 inches long. It will be necessary to replace the cutting tool as it becomes dulled. Presently, the particular tool used in the cutting head can mill about 40 inches in a ½ inch thick plate at ⅜ inch per minute before replacement is indicated. Replacement is easily accomplished by loosening set screws 42. Test results show a capability of milling the ¾ × 24 inch slot in ½ inch steel in about 40 minutes. If the frame is bolted to the workpiece a similar slot of 50 to 60 inches can be cut before replacement. The longer cut is due to the faster advance speed of the cutting head. As has been stated, the use of the suction grippers limits the rate of the advance but it more than makes up for the slower advance by the ease and quickness with which the frame can be repositioned for continuation cuts.

In summary, the particular milling machine which has been described is characterized by the following data:

| | |
|---|---|
| Total weight in Air | 146 |
| Total Weight in Water | 103 |
| Weight of Mill Frame in Air | 111 |
| Weight of Cutting Head in Air | 35 |
| Weight of Hydraulic Control Manifold In Air | 20 |
| Weight of Hydraulic Control Manifold in Water | 14 |
| Overall Dimensions of Mill Frame (including Cutting Head) | 13 × 20 × 58" |
| Overall Dimensions of Hydraulic Control Manifold | 4 × 8 × 14" |
| Length of Cut | 24" |
| Width of Cut | ¾" |
| Time Required for One Cut | 32 minutes |
| Hydraulic Supply Pressure | 1000-3000 psi at control manifold |
| Hydraulic Supply Flow Rate | 7 gpm |
| Maximum Back Press | 100 psi over ambeint pressure at control manifold. |

Obviously many modifications and variations of the present invention are possible in the light of the above teachings. It is therefore to be understood that within the scope of the appended claims the invention may be practiced otherwise than as specifically described.

We claim:

1. Diver-controlled apparatus for performing underwater milling operations on a deeply submerged work piece comprising:
   an elongate frame, a feed screw carried by and extending lengthwise of the frame, a frame-supported cutter housing, a cutter member operably mounted in said housing, a hydraulic diver-controlled submersible motor for rotatably driving said cutter member, nut means carried by said housing in threaded engagement with said feed screw, a diver-controlled hydraulic submersible motor for rotatably driving said feed screw whereby the housed cutter member is threadably advanced along the screw to perform said cutting operation, diver-controlled suction gripper means for securing the frame to said submerged workpiece, said means including:

a plurality of gripper members having surfaces for engaging said submerged workpiece, a hydraulic pump for establishing a submerged pressure-differential across said engaged gripper member surfaces whereby said gripper members securely hold said frame on said workpiece during said cutting operations, a diver-controlled hydraulic motor for driving said pump, and a thin-walled submersible casing including pressure-compensation means for balancing ambient seawater pressure enclosing said pump and pump motor, a source of hydraulic fluid, conduit means for applying said source fluid to said hydraulic motors, and diver-controlled means for individually regulating the fluid flow rate to each motor.

2. The apparatus of claim 1 wherein said flow rate regulating includes:

an intake manifold for receiving said source fluid, a casing carrying said intake manifold and itself being formed with a plurality of chambers each individually communicated with said intake manifold fluid, motor supply conduits communicating each chamber individually with each of said motors, and diver-operated flow control valves for each chamber.

3. The apparatus of claim 2 wherein said pump and pump motor casing is a thin-walled member filled with hydraulic fluid, said pump-driving motor discharging its hydraulic fluid supply directly into said filled casing to establish an interior pressure for balancing ambient seawater pressure whereby said thin-walled structure can safely withstand the ambient pressure.

4. The apparatus of claim 2 wherein said hydraulic pump is operably coupled to said gripper members by a conduit for evacuating seawater through said pump from said engaged surface areas of the gripper members for establishing said pressure-differential, said conduit including a diver-controlled by-pass valve adapted when opened to admit ambient seawater to said pump whereby said surface area evacuation is eliminated and said gripper members are released.

5. The apparatus of claim 4 wherein each gripper pad member is provided with sharpened metal prongs adapted to dig into the workpiece.

6. The apparatus of claim 4 further including:

a diver-controlled activating and deactivating valve mounted in each of said motor supply conduits whereby said diver has an on-off control of said motor supplies as well as a flow rate control.

7. The apparatus of claim 6 wherein said rotatable drive for said feed screw advances said cutter member in one direction for making said cut, said feed screw drive including:

a diver-operated coupling for disconnecting and reconnecting the motor drive, and a handwheel coupled to said feed screw for manually rotating said screw to return said cutter member to a start position.

8. The apparatus of claim 6 wherein said elongate frame is formed at each end with a platform member, said gripper members being mounted in each platform; said apparatus further including:

a leveling pad mechanism carried by each platform, each of said mechanisms including:

an elongate shaft member projecting through said platform and formed with an axial opening, a flat-faced pad member carried by said shaft between the platform and the workpiece, and means for adjusting the position of each of said shafts relative to said platform for moving the flat face of said pads into engagement with said workpiece, whereby said pads can be engaged with said workpiece to mark the position of said axial openings and a fastening bolt-like device inserted through said axial opening to physically engage said workpiece and provide the holding force for said frame.

9. The apparatus of claim 8, wherein said pump and pump motor casing is a thin-walled member filled with hydraulic fluid, said pump-driving motor discharging its hydraulic fluid supply directly into said filled casing to establish an interior pressure for balancing ambient seawater pressure whereby said thin-walled structure can safely withstand the ambient pressure.

* * * * *